United States Patent
Wakuda

(10) Patent No.: US 9,892,078 B2
(45) Date of Patent: Feb. 13, 2018

(54) INFORMATION PROCESSING APPARATUS AND CONTROL METHOD OF THE INFORMATION PROCESSING APPARATUS

(71) Applicant: FUJITSU LIMITED, Kawasaki-shi, Kanagawa (JP)

(72) Inventor: Rinko Wakuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 237 days.

(21) Appl. No.: 15/048,349

(22) Filed: Feb. 19, 2016

(65) Prior Publication Data
US 2016/0275030 A1    Sep. 22, 2016

(30) Foreign Application Priority Data
Mar. 18, 2015  (JP) .................................. 2015-054875

(51) Int. Cl.
G06F 13/40 (2006.01)
G06F 13/42 (2006.01)
G06F 13/24 (2006.01)

(52) U.S. Cl.
CPC .......... *G06F 13/4022* (2013.01); *G06F 13/24* (2013.01); *G06F 13/4282* (2013.01)

(58) Field of Classification Search
CPC ......................... G06F 2201/86; G06F 13/0422
See application file for complete search history.

(56) References Cited

U.S. PATENT DOCUMENTS

2011/0320860 A1    12/2011    Coneski et al.

FOREIGN PATENT DOCUMENTS

| JP | 2013-534665 | 9/2013 |
| WO | 2011160712 | 12/2011 |

*Primary Examiner* — Farley Abad
(74) *Attorney, Agent, or Firm* — Fujitsu Patent Center

(57) ABSTRACT

A core, PCIe devices, and a PCIe switch are provided. A PCIe bridge includes a device tree data that indicates the location of each of the PCIe devices with respect to the core via the PCIe switch and an action list in which a process causing one of the PCIe devices to perform when an event occurs in the one of the PCIe devices. If an event occurs in a specific PCIe device, the PCIe bridge acquires an event occurrence notification; specifies the location of the specific PCIe device from the device tree data on the basis of an event occurrence notification; extracts the process causing the specific PCIe device to perform from the action list; and sends an execution instruction of the extracted process to the specific PCIe device on the basis of the specified location.

5 Claims, 9 Drawing Sheets

FIG.2

| VENDOR ID: xxx, DEVICE ID: YYY ||||
|---|---|---|---|
| TRIGGER | CONFIG REGISTER ADDRESS | READ/ WRITE | WRITE DATA |
| INITIALIZATION TIME | 0x010 | READ | |
| INITIALIZATION TIME | 0x014 | WRITE | 0x12345678 |
| INITIALIZATION TIME | 0x028 | WRITE | 0x11111111 |
| INITIALIZATION TIME | 0x03c | WRITE | 0x9ABCDEF0 |
| CORRECTABLE ERROR MESSAGE RECEPTION TIME | 0x078 | READ | |
| CORRECTABLE ERROR MESSAGE RECEPTION TIME | 0x0c0 | WRITE | 0xf0000000 |
| UNCORRECTABLE ERROR MESSAGE RECEPTION TIME | 0x07c | READ | |
| UNCORRECTABLE ERROR MESSAGE RECEPTION TIME | 0x0c4 | WRITE | 0xf0000000 |
| MSI RECEPTION TIME | 0x050 | READ | |
| MSI RECEPTION TIME | 0x054 | WRITE | 0xf0000000 |

FIG.4

| BDF | VENDOR ID | DEVICE ID | PHYSICAL ADDRESS OFFSET |
|---|---|---|---|
| 0:0.0 | 10cf | 179d | 10.0000.0000h |
| 0:4.0 | 10cf | 179c | 10.0002.0000h |
| 2:0.0 | 10b5 | 8617 | 10.0020.0000h |
| 3:1.0 | 10b5 | 8617 | 10.0030.0000h |
| 4:0.0 | 1000 | 0087 | 10.0040.0000h |
| 3:3.0 | 10b5 | 8617 | 10.0030.0000h |
| 5:0.0 | 8086 | 10c9 | 10.0050.0000h |
| 5:0.1 | 8086 | 10c9 | 10.0050.0000h |

INFORMATION PROCESSING APPARATUS AND CONTROL METHOD OF THE INFORMATION PROCESSING APPARATUS

CROSS-REFERENCE TO RELATED APPLICATION

This application is based upon and claims the benefit of priority of the prior Japanese Patent Application No. 2015-054875, filed on Mar. 18, 2015, the entire contents of which are incorporated herein by reference.

FIELD

The embodiment discussed herein is directed to an information processing apparatus and a control method of the information processing apparatus.

BACKGROUND

For example, Peripheral Component Interconnect Express (PCIe) is known as a bus standard designed to connect a central processing unit (CPU) and an input/output (I/O) device inside a computer that is an information processing apparatus. The PCIe has a tree structure with a root complex at the top and the I/O device at the bottom. In order to connect a plurality of I/O devices, a PCIe switch is disposed at the middle point of the tree structure.

For example, for I/O devices conforming to the PCIe standard, there are Ethernet (registered trademark) controllers and Serial Advanced Technology Attachment (SATA) controllers.

Even if these controllers conforming to the PCIe standard follows the PCIe specifications, the minute operation specifications, such as an error handling or initialization vary depending on controllers developed by each manufacturer.

Conventionally, each device driver performs a process conforming to each controller, whereby a controller is operated. Thus, developers of the device drivers usually understand the operation of hardware and install processes into the device drivers.

For example, when an error handling is performed, a specific controller is not able to detect a subsequent error unless an error status of a specific register is cleared; however, there is also a different specification in which another controller can detect a subsequent error even if the controller does not clear the same register. In order to appropriately detect an error in hardware, a device driver needs to be associated with each controller in a manner in which, for example, an error status of a specific register is cleared in a specific controller and the error status does not need to be cleared in another controller.

As a method of processing an event that occurs in a PCIe device, there is a conventional technology that blocks an instruction with respect to a device in which an event is detected and that controls the device on the basis of the command that is subsequently received from an operating system (OS).

Patent Document 1: Japanese National Publication of International Patent Application No. 2013-534665

However, if a device driver is changed for each controller, which is conventionally performed, the number of steps used for performing error handling conforming to hardware is increased in the development of software in a case in which, for example, a device driver is used for each controller.

Furthermore, if a conventional technology that blocks an instruction with respect to a device and that controls the device in accordance with a command received from an OS, it is possible to perform processes common in each device; however, it is difficult to absorb a difference between devices.

SUMMARY

According to an aspect of an embodiment, an information processing apparatus includes: an arithmetic processing unit; a plurality of processing units each of which performs a process in accordance with an instruction sent from the arithmetic processing unit; a switch that relays communication between the arithmetic processing unit and the processing units; and an input/output control unit that has location information on the location of each of the processing units with respect to the arithmetic processing unit via the switch and execution process information in which a process causing each of the processing units to perform when an event occurs in each of the processing units is registered, that acquires an event occurrence notification when the event occurs in a specific processing unit, that specifies the location of the specific processing unit from the location information on the basis of the acquired event occurrence notification, that extracts a process causing the specific processing unit to perform from the execution process information, and that sends an execution instruction of the extracted process to the specific processing unit on the basis of the specified location.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a schematic diagram illustrating an example of data stored in an external ROM and an action list;

FIG. 4 is a schematic diagram illustrating an example of device tree data;

DESCRIPTION OF EMBODIMENT

Preferred embodiments of the present invention will be explained with reference to accompanying drawings. The information processing apparatus and the control method of the information processing apparatus disclosed in the present invention is not limited to the embodiment described below.

Figure 1:
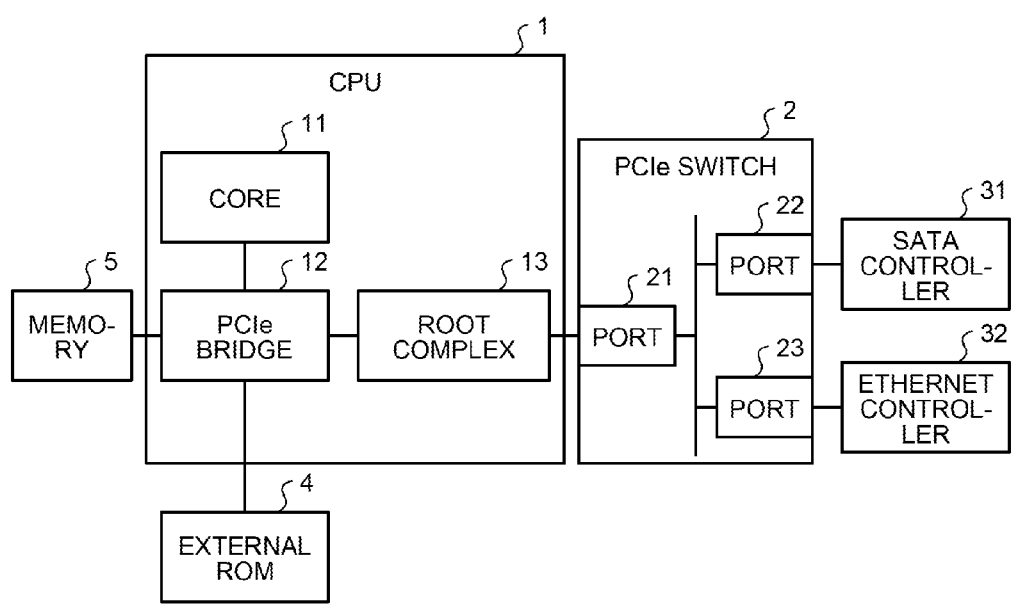
FIG. 1 is a schematic diagram illustrating an information processing apparatus according to an embodiment.

FIG. 1 is a schematic diagram illustrating an information processing apparatus according to an embodiment. The information processing apparatus according to the embodiment includes a CPU 1 and a PCIe switch 2. Furthermore, the information processing apparatus according to the embodiment includes a SATA controller 31, an Ethernet controller 32, an external read only memory (ROM) 4, and a memory 5. The memory 5 is a main storage device.

The SATA controller 31 is a controller conforming to the PCIe standard. For example, a hard disk, a solid state drive (SSD), an optical drive, or the like is connected to the SATA controller 31.

The Ethernet controller 32 is a controller conforming to the PCIe standard. The Ethernet controller 32 is a device that is used to connect to a network.

In the embodiment, the SATA controller 31 and the Ethernet controller 32 is used as an example of a PCIe device; however, another device may also be used for the PCIe device as long as the device conforms to the PCIe standard. In a description below, when the SATA controller 31 and the Ethernet controller 32 are not distinguished, the SATA controller 31 and the Ethernet controller 32 will be referred to as a "PCIe device 30". The PCIe device 30 mentioned here corresponds to an example of a "processing unit".

The CPU 1 is an arithmetic processing device. The CPU 1 includes a core 11, a PCIe bridge 12, and a root complex 13.

The core 11 is an arithmetic processing unit. The core 11 is connected to the root complex 13 via the PCIe bridge 12. When a power supply of the information processing apparatus is turned on, the core 11 receives, from the PCIe bridge 12, an input of information about the PCIe device 30 that is connected to the PCIe switch 2. Then, the core 11 creates device location information on each of the PCIe devices 30. The device location information mentioned here is information indicating the location of the PCIe device 30 with respect to the core 11 via the PCIe switch 2 and, in other words, information indicating the location of each of the PCIe devices 30 in the device tree with the root complex 13 at the top. Specifically, the device location information is represented by a bus number, a device number, and a function number. In a description below, the device location information may sometimes be referred to as a "BDF (registered trademark)" by using the initial letter of each of the numbers included in the device location information. Furthermore, the core 11 initializes the PCIe device 30 that is connected to the PCIe switch 2. Then, the core 11 outputs, to a system-side input unit 122, a notification of the initialization of the PCIe device 30 together with the identification information on each of the PCIe devices 30 and the created device location information.

Furthermore, the core 11 sends an instruction to the PCIe device 30 via the PCIe bridge 12, the root complex 13, and the PCIe switch 2 and receives a response from the PCIe device 30.

The PCIe bridge 12 is connected to the core 11, the root complex 13, the external ROM 4, and the memory 5 by a bus. The PCIe bridge 12 is a device that causes the root complex 13 to perform protocol conversion. Specifically, the PCIe bridge 12 sends, to the root complex 13, information that is used to transfer, in accordance with a PCIe specification code, the instruction sent from the core 11 and causes the root complex 13 to send the instruction to the PCIe device 30 via the bus of the PCIe. Furthermore, the PCIe bridge 12 transfers the data acquired from the root complex 13 to the core 11.

Furthermore, the PCIe bridge 12 controls a direct memory access (DMA) between the PCIe device 30 and the memory 5. Furthermore, the PCIe bridge 12 reads information stored in the external ROM 4.

The root complex 13 is connected to the core 11 via the PCIe bridge 12. Furthermore, the root complex 13 is connected to the PCIe device 30 via the PCIe switch 2. The root complex 13 is a device that performs protocol conversion.

Specifically, the root complex 13 creates, from the instruction sent from the core 11, a packet conforming to the PCIe in accordance with the setting received from the PCIe bridge 12. Then, the root complex 13 sends the created packet to the PCIe device 30 via the PCIe switch 2. Furthermore, the root complex 13 converts the data sent from the PCIe device 30 to the protocol associated with the system bus connected to the core 11 and then sends the protocol to the PCIe bridge 12.

Namely, the path from the core 11 to the root complex 13 is connected by a system bus. In contrast, the path from the root complex 13 to the PCIe device 30 is connected by a PCIe bus.

The PCIe switch 2 is a device that is used to connect the plurality of the PCIe devices 30 to the root complex 13. The PCIe switch 2 includes a port 21 that is connected to the root complex 13. Furthermore, the PCIe switch 2 includes ports 22 and 23 that are used to connect the PCIe devices 30. Here, in the embodiment, a description will be given, as an example, in which the PCIe switch 2 includes two ports, i.e., the ports 22 and 23; however, the number of ports that are included in the PCIe switch 2 and that is used to connect the PCIe devices 30 is not limited to two. Furthermore, in practice, the CPU 1 and the PCIe devices 30 send and receive data or an instruction via the PCIe switch 2; however, to simplify a description, in a description below, a description will sometimes be given as if the CPU 1 and the PCIe devices 30 directly send and receive data or an instruction.

The external ROM 4 is a storage medium that can be removed from the information processing apparatus. In the external ROM 4, as illustrated in FIG. 2, information on processes to be performed when an event occurs is registered by associating the information with the vendor identification (ID) and the device ID that are identification information on the PCIe devices 30. FIG. 2 is a schematic diagram illustrating an example of data stored in an external ROM and an action list. Examples of the event include, for example, initialization of the PCIe devices 30, the occurrence of error and an interrupt in the PCIe devices 30. Furthermore, an example of information on the processes to be performed includes, for example, config register address that is used for a process, information indicating which of a reading process and a writing process needs to be performed, and write data that is used when a writing process is performed. The information indicating which of a reading process and a writing process needs to be performed is registered in the column of Read/Write illustrated in FIG. 2. Furthermore, the write data that is used when the writing process is performed is registered in the column of Write Data illustrated in FIG. 2.

Regarding the data in the external ROM 4, data related to the PCIe device 30 that is predicted to be mounted on the information processing apparatus is previously registered by an administrator of the information processing apparatus.

Because the PCIe device 30 that is used to perform a process is substantially fixed, the administrator can predict the PCIe device 30 depending on the process performed by the subject information processing apparatus.

Figure 3:
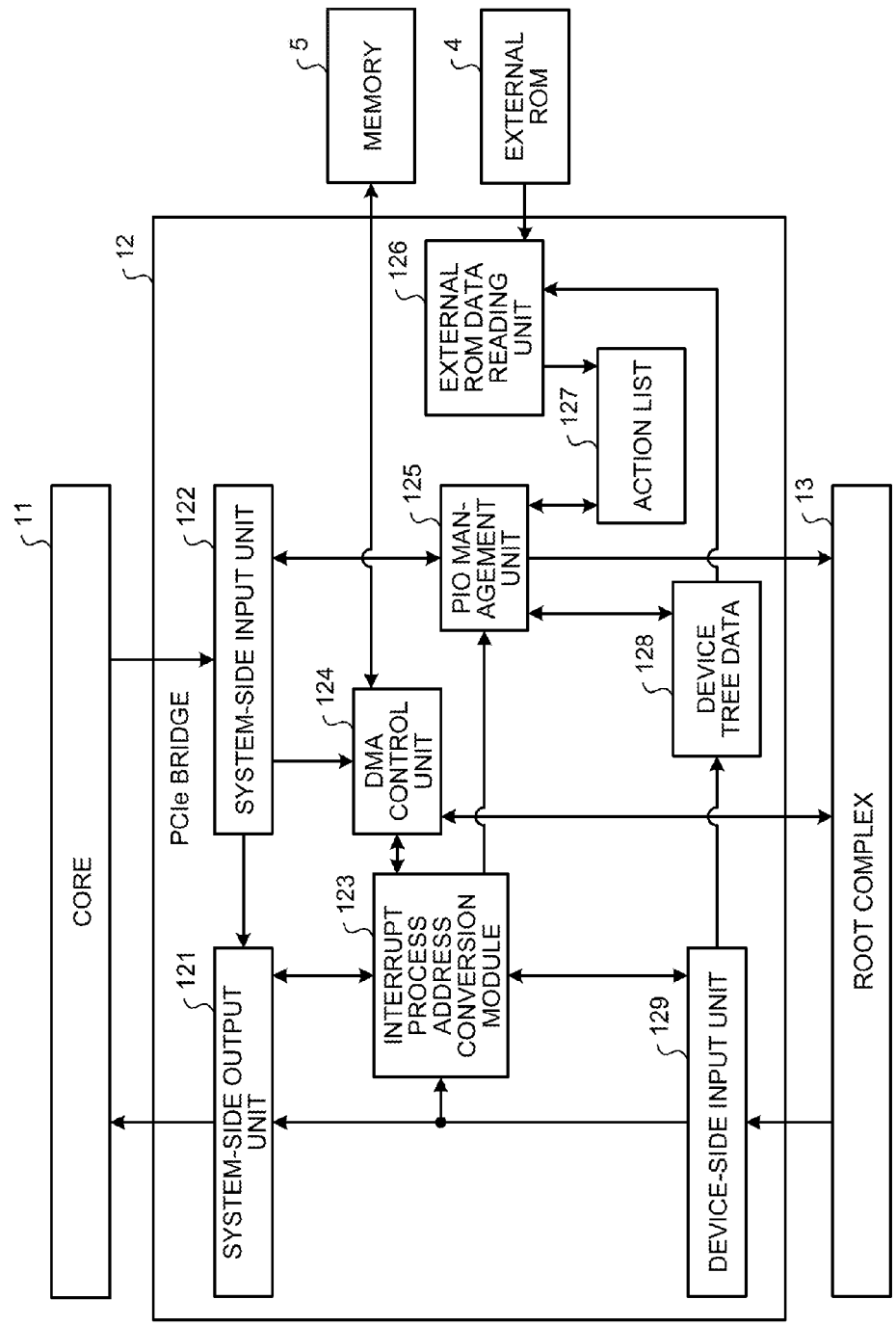
FIG. 3 is a block diagram illustrating, in detail, a PCIe bridge.

In the following, the PCIe bridge 12 will be described in detail with reference to FIG. 3. FIG. 3 is a block diagram illustrating, in detail, a PCIe bridge. The PCIe bridge 12 mentioned here corresponds to an example of an "input/output control unit".

The system-side output unit 121 includes an output interface for outputting a request to the core 11. a system-side output unit 121 is a module that processes a request from the core 11.

When the power supply of the information processing apparatus is turned on, the system-side output unit 121 receives, from a device-side input unit 129, information on the PCIe device 30 that is connected to the PCIe switch 2. Then, the system-side output unit 121 outputs the acquired information on the PCIe device 30 to the core 11.

The system-side output unit 121 receives the request from the system-side input unit 122 or the device-side input unit 129. In addition, the system-side output unit 121 receives the address that is used on the system side from an interrupt process address conversion module 123. Then, the system-side output unit 121 outputs, to the core 11, the request received together with the specified address.

Furthermore, if a request from the system-side input unit 122 or the device-side input unit 129 is an interrupt, the system-side output unit 121 receives an interrupt instruction from the interrupt process address conversion module 123. Then, the system-side output unit 121 outputs the received request to the core 11 in accordance with the interrupt instruction.

The system-side input unit 122 includes an input interface for receiving a request from the core 11. The system-side input unit 122 is a module that processes the request from the core 11.

When the power supply of the information processing apparatus is turned on, the system-side input unit 122 receives a notification of the initialization of the PCIe device 30 connected to the PCIe switch 2 from the core 11 together with the identification information and the device location information on each of the PCIe devices 30. Then, the system-side input unit 122 sends, to a PIO management unit 125, a notification of the initialization of the PCIe device 30 together with the vendor ID, the device ID, and the device location information on each of the PCIe devices 30.

The system-side input unit 122 receives a request from the core 11. Then, for example, if a programmed input output (PIO) request is received from the core 11, the system-side input unit 122 sends the received PIO request to the PIO management unit 125. Furthermore, if a request of the DMA process is received from the core 11, the system-side input unit 122 outputs the received request of the DMA process to a DMA control unit 124. Furthermore, if information with respect to the request for the core 11 is present, the system-side input unit 122 sends information with respect to the request to the system-side output unit 121.

The DMA control unit 124 controls the DMA process between the PCIe device 30 and the memory 5. The DMA control unit 124 receives a request for the DMA process from the system-side input unit 122. Furthermore, the DMA control unit 124 receives a request from the PCIe device 30 for the DMA process from the interrupt process address conversion module 123. Then, the DMA control unit 124 performs the DMA process of reading and writing the data from and to the memory 5 in accordance with the received instruction.

The interrupt process address conversion module 123 receives, from the device-side input unit 129, an input of the request sent from the PCIe device 30. Then, if the request is an interrupt, the interrupt process address conversion module 123 sends interrupt information to the system-side output unit 121 or the device-side input unit 129 in accordance with the type of interruption. Furthermore, the interrupt process address conversion module 123 notifies the PIO management unit 125 of the interrupt information.

Furthermore, the interrupt process address conversion module 123 acquires, from the request, the address specified by the PCIe device 30 and then converts the address to the address that is used on the system side. Then, the interrupt process address conversion module 123 outputs the converted address to the system-side output unit 121.

Furthermore, the interrupt process address conversion module 123 receives, from the device-side input unit 129, an error message of the PCIe device 30 sent from the PCIe device 30. Then, the interrupt process address conversion module 123 sends the error message to the PIO management unit 125.

The device-side input unit 129 includes an input interface for receiving a request from the root complex 13. The device-side input unit 129 is a module that processes a request from the root complex 13.

The device-side input unit 129 receives, from the root complex 13, information on the PCIe device 30 that is connected to the PCIe switch 2 when the power supply of the information processing apparatus is turned on. Then, the device-side input unit 129 sends the acquired information on the PCIe device 30 to the system-side output unit 121. Furthermore, the device-side input unit 129 acquires information on the vendor ID, the device ID, and the physical address offset from the information on each of the PCIe devices 30. Then, the device-side input unit 129 registers, in a device tree data 128, which will be described later, the vendor ID, the device ID, and the physical address offset of each of the PCIe devices 30.

Furthermore, the device-side input unit 129 receives, from the root complex 13, an input of a request sent from the PCIe device 30. Then, the device-side input unit 129 sends the received request to the system-side output unit 121 and the interrupt process address conversion module 123. Furthermore, if an interrupt occurs due to the request, the device-side input unit 129 receives interrupt information from the interrupt process address conversion module 123. Then, the device-side input unit 129 receives an input of the request from the root complex 13 in accordance with the interrupt information.

Furthermore, if the device-side input unit 129 receives an input of an error message of the PCIe device 30 or the interrupt information from the root complex 13, the device-side input unit 129 sends the received error message or the interrupt information to the interrupt process address conversion module 123.

The device tree data 128 stores therein the information illustrated in FIG. 4. FIG. 4 is a schematic diagram illustrating an example of device tree data. In the device tree data 128, for example, the vendor ID, the device ID, and the physical address offset are associated with device location information (BDF) and registered. The device location information in the device tree data 128 is registered by the PIO management unit 125, which will be described later. Furthermore, the vendor ID, the device ID, and the physical address offset in the device tree data 128 are registered by the device-side input unit 129. The device tree data 128 mentioned here corresponds to an example of "location information".

In the following, the combination of the device location information, the vendor ID, and the device ID physical address offset registered in the device tree data 128 is referred to as "device data". Furthermore, each of the registration locations of the device data in the device tree data 128 is referred to as an "entry of the device tree data 128".

Furthermore, in a action list 127, information on a process to be performed when the event illustrated in FIG. 2 occurs is registered for each of the PCIe devices 30 that are connected to the PCIe switch 2. Specifically, In the action list 127, the information on a process to be performed is registered by associating the information with the vendor ID and the device ID of each of the PCIe devices 30. Namely, the action list 127 is the information on the PCIe devices 30 connected to the PCIe switch 2 stored in the information registered in the external ROM 4. The action list 127 mentioned here corresponds to an example of "execution process information".

In a description below, the combination of information on a triggered event and a process to be performed in the action list 127 is referred to as "action data". Furthermore, each of the registration locations of the action data in the action list 127 is referred to as an "entry of the action list 127".

An external ROM data reading unit 126 refers to the device tree data 128 after the completion of registration of the information into the device tree data 128 performed by the device-side input unit 129 and the PIO management unit 125 when the power supply is turned on. Then, the external ROM data reading unit 126 acquires, from the device tree data 128, the vendor ID and the device ID of all of the PCIe devices 30 connected to the PCIe switch 2. Then, the external ROM data reading unit 126 acquires, from the external ROM 4, the information on the process to be performed when the event that is associated with the acquired vendor ID and the device ID occurs. Then, the external ROM data reading unit 126 associates the information on the process to be performed when the acquired event occurs with the combination of the vendor ID and the device ID and then registers the associated information in the action list 127.

When the power supply of the information processing apparatus is turned on, the PIO management unit 125 receives, from the system-side input unit 122, a notification of initialization of each of the PCIe devices 30 together with the device location information. Then, the PIO management unit 125 sends a PIO request for acquiring the ID to the PCIe device 30 that is specified by the device location information. The vendor Id and the device ID are stored in the Offset 0x00 in the Common Configuration Space Header prescribed in the specification of PCIe. Then, the PIO management unit 125 sends a PIO that performs Configuration Read with respect to this register. Thereafter, the PIO management unit 125 acquires, from the system-side input unit 122, the vendor ID and the device ID of the PCIe device 30 in accordance with the device location information.

Then, the PIO management unit 125 registers the device location information associated with the vendor ID and the device ID of each of the PCIe devices 30 into the device tree data 128.

Figure 5:
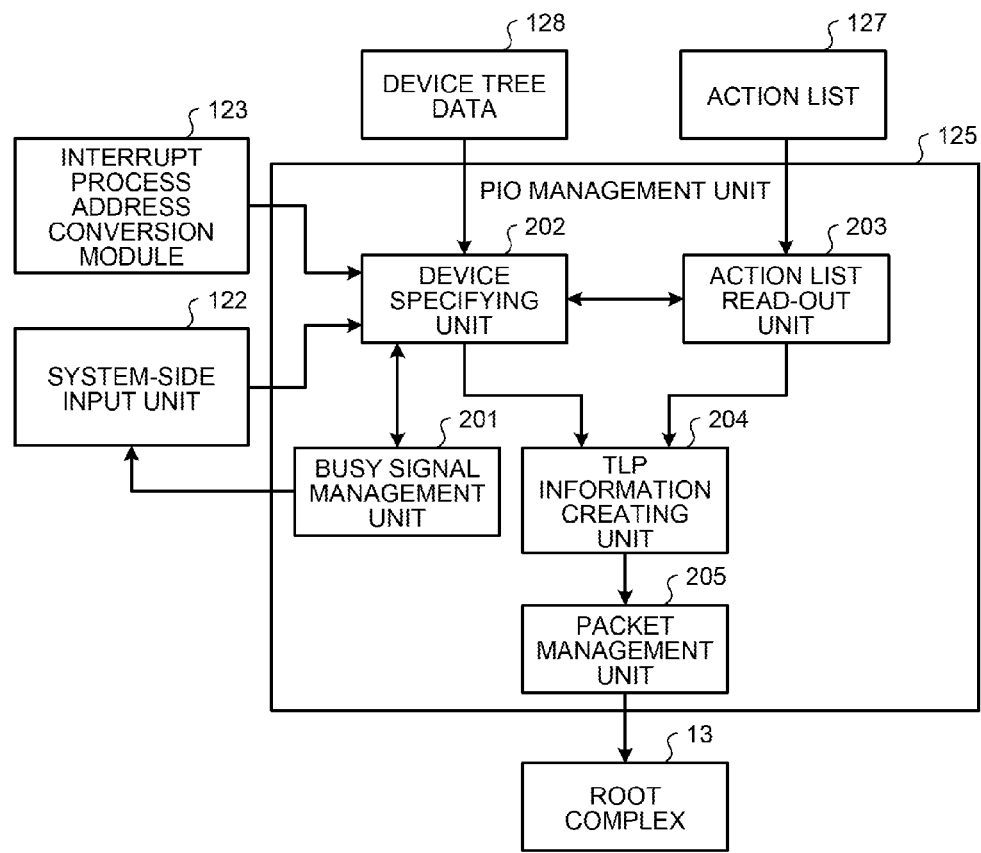
FIG. 5 is a block diagram illustrating, in detail, a PIO management unit.

Furthermore, the function performed by the PIO management unit 125 when an event occurs will be described in detail with reference to FIG. 5. FIG. 5 is a block diagram illustrating, in detail, a PIO management unit. However, in FIG. 5, only the function performed by the PIO management unit 125 when an event occurs is extracted and illustrated.

The PIO management unit 125 includes, as illustrated in FIG. 5, a busy signal management unit 201, a device specifying unit 202, an action list read-out unit 203, a transaction layer packet (TLP) information creating unit 204, and a packet management unit 205.

The busy signal management unit 201 monitors communication between the system-side input unit 122 and the PIO management unit 125. The busy signal management unit 201 receives a busy signal issue request from the device specifying unit 202. Then, if a process is performed on a packet with the system-side input unit 122, the busy signal management unit 201 waits until the process has been completed. After the process of the packet has been completed, the busy signal management unit 201 issues a busy signal to the system-side input unit 122. Consequently, it is possible to stop an input of the packet from the system-side input unit 122 to the PIO management unit 125. The busy signal management unit 201 notifies the device specifying unit 202 that the busy signal has been issued.

Then, the busy signal management unit 201 receives, from the device specifying unit 202, an instruction to stop issuing the busy signal. Then, the busy signal management unit 201 stops issuing the busy signal. Consequently, an input of the packet from the system-side input unit 122 to the PIO management unit 125 is resumed.

The device specifying unit 202 receives a notification of initialization of the PCIe device 30 from the system-side input unit 122 together with the vendor ID and the device ID of each of the PCIe devices 30. Then, the device specifying unit 202 notifies the busy signal management unit 201 of an issue request for a busy signal. Then, the device specifying unit 202 receives, from the busy signal management unit 201, a notification that the busy signal has been issued.

When the notification that the busy signal has been issued is received, the device specifying unit 202 sets a device pointer at the top of the entry in the device tree data 128. Then, the device specifying unit 202 determines whether device data is present in the entry indicated by the device pointer.

If the device data is present in the entry indicated by the device pointer, the device specifying unit 202 notifies the action list read-out unit 203 of the vendor ID and the device ID indicated by the device pointer and the notification indicating that the event that has occurred is initialization. Furthermore, the device specifying unit 202 acquires, from the device tree data 128, the physical address offset in the entry indicated by the device pointer. Then, the device specifying unit 202 sends the acquired physical address offset, the vendor ID, and the device ID to the TLP information creating unit 204.

Thereafter, if the device specifying unit 202 receives, from the action list read-out unit 203, a notification indicating that reading of the action data has been completed, the device specifying unit 202 moves the device pointer to the subsequent entry in the device tree data 128. In the following, to move the device pointer to the subsequent entry in the device tree data 128 is referred to as to "increment the device pointer".

Then, the device specifying unit 202 repeatedly sends a notification of the vendor ID, the device ID, and the physical address offset and repeatedly increments the device pointer until the device pointer indicates the entry in which no device data is registered. If the entry indicates the device pointer in which no device data is registered, the device specifying unit 202 instructs the busy signal management unit 201 to stop issuing the busy signal.

Furthermore, the device specifying unit 202 receives a notification of the occurrence of error and an interrupt in the PCIe device 30 from the interrupt process address conversion module 123 together with the vendor ID and the device ID of the PCIe device 30. Then, the device specifying unit 202 notifies the busy signal management unit 201 of an issue request for a busy signal. Thereafter, the device specifying unit 202 receives, from the busy signal management unit 201, a notification of an issue of the busy signal.

If the device specifying unit 202 receives the notification of the issue of the busy signal, the device specifying unit 202 sets a device pointer to the combination of the vendor ID and the device ID stored at the top in the device tree data 128. Then, the device specifying unit 202 determines whether the combination of the received vendor ID and the device ID matches the combination of the vendor ID and the device ID indicated by the device pointer.

If the combination of the vendor ID and the device ID indicated by the device pointer does not match, the device specifying unit 202 increments the device pointer.

In contrast, if the combination of the vendor ID and the device ID indicated by the device pointer matches, the device specifying unit 202 notifies the action list read-out unit 203 of the vendor ID and the device ID indicated by the device pointer and the information on the event that has occurred. In this case, the information on the event that has occurred is information on the occurrence of error in the PCIe device 30 or information on an interrupt. Furthermore, the device specifying unit 202 acquires, from the device tree data 128, the physical address offset associated with the vendor ID and the device ID indicated by the device pointer. Then, the device specifying unit 202 sends the acquired physical address offset, the vendor ID, and the device ID to the TLP information creating unit 204.

Thereafter, the device specifying unit 202 receives, from the action list read-out unit 203, a notification indicating that the reading of the action data has been completed. Then, the device specifying unit 202 instructs the busy signal management unit 201 to stop issuing the busy signal.

At this point, in the embodiment, because the occurrence of error or an interrupt related to a single PCIe device 30 is handled, the matched combination of the vendor ID and the device ID indicated by the device pointer is targeted for the process and the other PCIe devices 30 are not targeted for the process. Consequently, in the embodiment, after the device specifying unit 202 detects the combination of the vendor ID and the device ID that is indicated by the device pointer and that matches the combination of the received vendor ID and the device ID, the device specifying unit 202 ends the process. However, the flow of the process of specifying the PCIe device 30 performed by the device specifying unit 202 is not limited to this.

For example, after the device specifying unit 202 detects the combination of the vendor ID and the device ID that is indicated by the device pointer and that matches the combination of the received vendor ID and the device ID, the device specifying unit 202 may also repeatedly increment the device pointer and specify the PCIe device 30. In this case, when no combination of the vendor ID and the device ID indicated by the device pointer is present, the device specifying unit 202 instructs the busy signal management unit 201 to stop issuing a busy signal. By doing so, even if errors and interrupts occur in the plurality of the PCIe devices 30, the PCIe bridge 12 can handle these events at one time.

The action list read-out unit 203 receives the vendor ID and the device ID from the device specifying unit 202. Furthermore, the action list read-out unit 203 receives, from the device specifying unit 202, the information on the event that has occurred, i.e., information indicating which of the initialization, an error, and an interrupt has occurred in the PCIe device 30 occurs. In the following, the event indicated by the information on the event that has occurred is referred to as a "reception event".

The action list read-out unit 203 extracts the action list 127 associated with the acquired vendor ID and the device ID. Then, the action list read-out unit 203 sets an action pointer to the top entry in the extracted action list 127.

Then, the action list read-out unit 203 determines whether the trigger described in the entry indicated by the action pointer matches the reception event. The trigger of the "initialization time" indicated in the action list 127 illustrated in FIG. 2 corresponds to a case in which the PCIe device 30 is initialized. Furthermore, the trigger of the "Correctable Error message reception time" and the "Uncorrectable Error message reception time" correspond to a case in which an error occurs in the PCIe device 30. Furthermore, the trigger of the "MSI reception time" corresponds to a case in which an interrupt is performed by the PCIe device 30.

If a case matches the reception event, the action list read-out unit 203 acquires, from the entry indicated by the action pointer in the action list 127, config register address and information indicating which of a reading process and a writing process needs to be performed. Furthermore, if the process to be performed is the writing process, the action list read-out unit 203 acquires write data from the entry in the action list 127. Then, the action list read-out unit 203 notifies the TLP information creating unit 204 of the acquired information. Then, the action list read-out unit 203 moves the action pointer to the subsequent entry. In a description below, the movement of the action pointer to the subsequent entry is referred to as to "increment the action pointer".

Furthermore, if the trigger described in the entry indicated by the action pointer does not match the reception event, the action list read-out unit 203 increments the action pointer.

The action list read-out unit 203 determines whether the trigger matches the reception event until the action pointer indicates the entry with no action data. Furthermore, if the trigger matches the reception event, the action list read-out unit 203 repeatedly acquires information on the process to be performed and repeatedly sends the acquired information to the TLP information creating unit 204. If no data indicated by the action pointer is present, the action list read-out unit 203 notifies the device specifying unit 202 that the reading of the action data has been completed.

Then, if the subsequent vendor ID and the device ID are sent from the device specifying unit 202, the action list read-out unit 203 repeats the same process on the subject vendor ID and the device ID.

The TLP information creating unit 204 receives the physical address offset, the vendor ID, and the device ID from the device specifying unit 202. Furthermore, the TLP information creating unit 204 receives the information on the process to be performed from the action list read-out unit 203.

Figure 6:
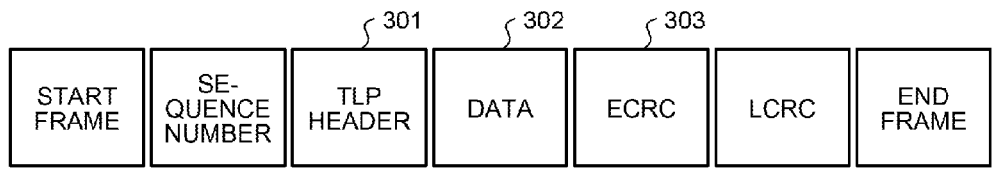
FIG. 6 is a schematic diagram illustrating a PCIe packet in a physical layer.

Then, the TLP information creating unit 204 determines the information that is used to create the TLP from the received information. The TLP mentioned here is a packet used in the transaction layer. FIG. 6 is a schematic diagram illustrating a PCIe packet in a physical layer. The TLP is formed by a TLP header 301, data 302, and end to end cyclic redundancy check (ECRC) 303. Furthermore, the packet obtained by attaching the sequence number and link cyclic redundancy check (LCRC) to the TLP is a data link layer packet. Furthermore, the packet obtained by attaching a start frame and an end frame to the data link layer packet is a physical layer packet. The TLP information creating unit 204 determines the information that is used to create the TLP header 301. Furthermore, if a writing process is performed, the TLP information creating unit 204 determines that the data to be written to the data 302 is stored.

Figure 7:
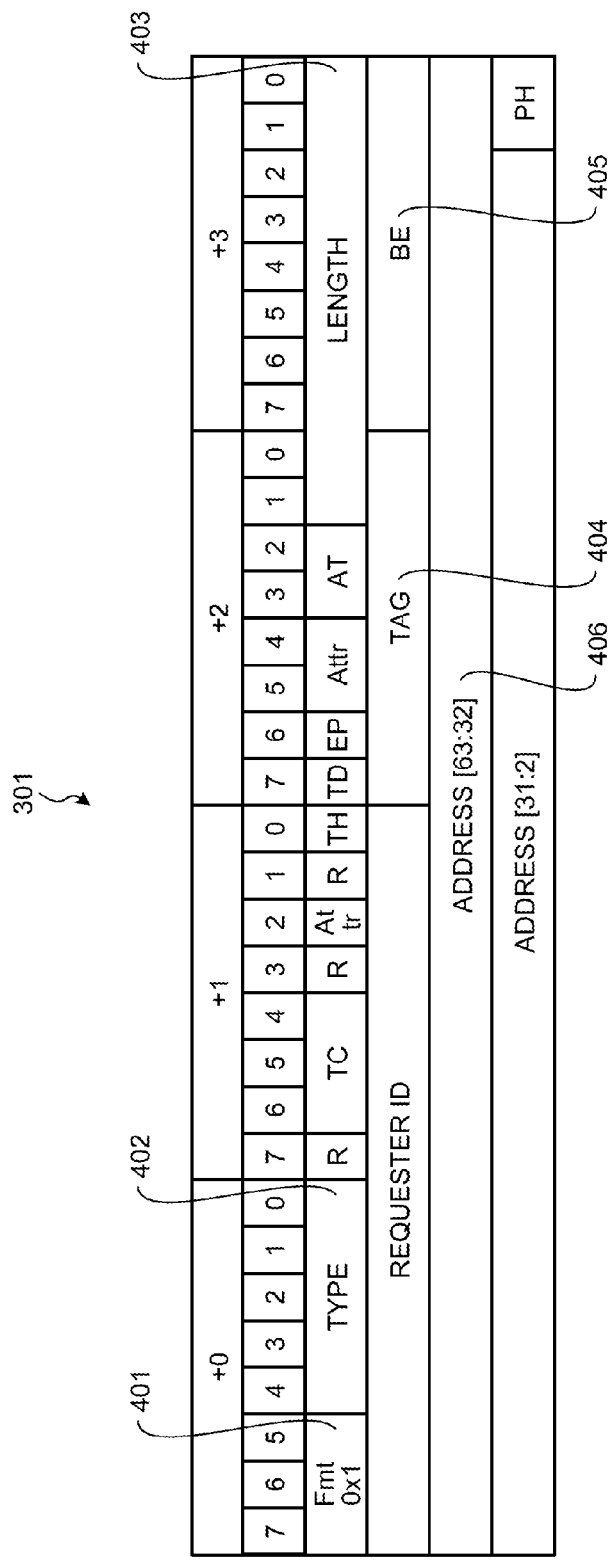
FIG. 7 is a schematic diagram illustrating, in detail, a TLP header.

FIG. 7 is a schematic diagram illustrating, in detail, a TLP header. A format (Fmt) 401 is an item representing the TLP format. Furthermore, for a Type 402, the type of TLP is determined by the Fmt 401 and the Type 402 representing the type of TLP. Furthermore, a Length 403 is an item representing the length of data in the packet. A Tag 404 is an item representing the number used to manage control of the order of data. A byte enable (BE) 405 is an item representing a specification of bytes that is used to permit the writing. An address 406 is an item representing a specification of the address to be used.

The TLP information creating unit 204 sets Config Read/Write that is a use policy of PCIe to the Fmt 401 and the Type 402. Furthermore, the TLP information creating unit 204 sets the Length 403 as 4 bytes. Furthermore, the TLP information creating unit 204 sets 0000_xxxx in the BE 405. Here, for the symbol xxxx, bytes targeted for the reading is specified. Furthermore, the TLP information creating unit 204 sets numbers to the Tag 404 in ascending order.

Furthermore, the TLP information creating unit 204 sets, to the config register address acquired from the action list 127, the number of bits obtained by adding the physical address offset to the bits [11:0] in the Address 406. For the upper Address 406, the config space of the PCIe device 30 defined by a bus number for each system is specified.

Furthermore, if the TLP is a writing process, the TLP information creating unit 204 sets the write data acquired from the action list 127 in the data 302 illustrated in FIG. 6.

Then, the TLP information creating unit 204 sends the setting information and the write data of the TLP to the packet management unit 205 together with the device location information.

The packet management unit 205 receives the setting information and the write data of the TLP from the TLP information creating unit 204. Then, in order to issue the TLP in a state in which no request from the system-side input unit 122 is present, the packet management unit 205 creates a dummy PIO request signal that is used to shift a state machine. Then, the packet management unit 205 receives the created dummy PIO request signal and shifts to the state in which the TLP is issued. Thereafter, the packet management unit 205 sends the setting information, the write data, and the device location information to the root complex 13.

Furthermore, if the process performed on the PCIe device 30 with respect to an event is the writing process, the PIO management unit 125 stores the Read data obtained before writing the data; performs Read again after writing the data; and determines, by comparing two values, whether the writing has been performed.

Figure 8:
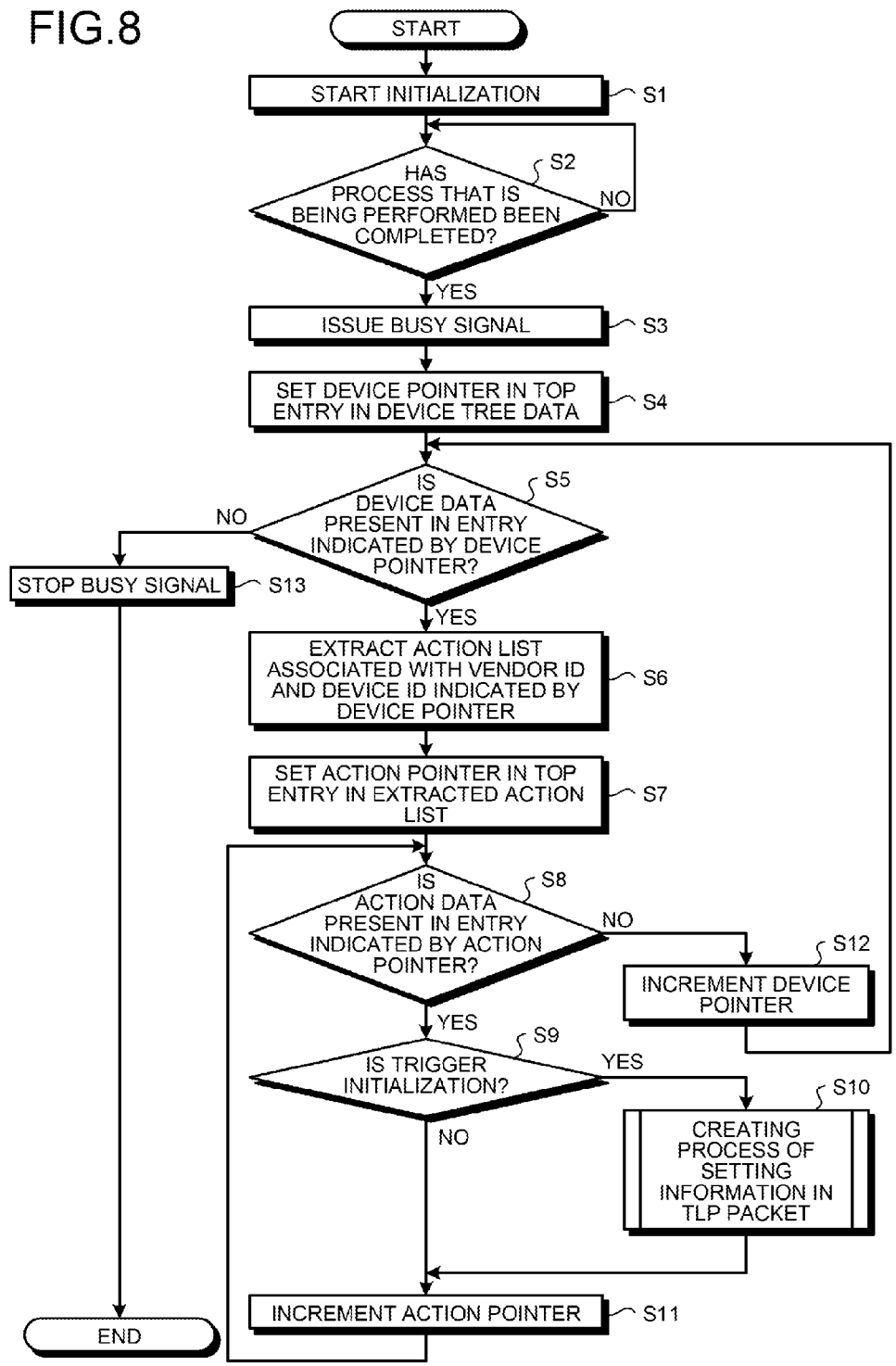
FIG. 8 is a flowchart illustrating the flow of a creating process of setting information in the TLP packet at the time of initialization due to the PCIe bridge according to the embodiment.

In the following, a creating process of setting information in a TLP packet at the time of initialization due to the PCIe bridge 12 according to the embodiment will be described with reference to FIG. 8. FIG. 8 is a flowchart illustrating the flow of a creating process of the setting information in the TLP packet at the time of initialization due to the PCIe bridge according to the embodiment.

The core 11 starts the initialization of the PCIe device 30 connected to the PCIe switch 2 (Step S1). The device specifying unit 202 receives a notification of the initialization of the PCIe device 30 from the core 11 via the system-side input unit 122. Then, the device specifying unit 202 sends an issue request of a busy signal to the busy signal management unit 201.

In response to the issue request of the busy signal, the busy signal management unit 201 determines whether the process being performed between the core 11 and the PIO management unit 125 via the system-side input unit 122 has been completed (Step S2). If the process being performed has not been completed (No at Step S2), the busy signal management unit 201 waits until the process that is being performed is completed. In contrast, if the process that is being performed has been completed (Yes at Step S2), the busy signal management unit 201 issues a busy signal to the system-side input unit 122 (Step S3). Then, the busy signal management unit 201 notifies the device specifying unit 202 that the busy signal has been issued.

Then, the device specifying unit 202 sets a device pointer in the top entry in the device tree data 128 (Step S4).

Then, the device specifying unit 202 determines whether the device data indicated by the device pointer is present (Step S5).

If the device data is present in the entry indicated by the device pointer (Yes at Step S5), the device specifying unit 202 notifies the action list read-out unit 203 of the vendor ID and the device ID stored in the entry indicated by the device pointer. The action list read-out unit 203 extracts the action list 127 that is associated with the vendor ID and the device ID indicated by the device pointer (Step S6).

The action list read-out unit 203 sets an action pointer in the top entry in the extracted action list 127 (Step S7).

The action list read-out unit 203 determines whether action data is present in the entry indicated by the action pointer (Step S8). If the action data is present (Yes at Step S8), the action list read-out unit 203 determines whether the trigger of the subject action data is the initialization (Step S9). If the trigger is the initialization (Yes at Step S9), the action list read-out unit 203 performs the creating process of the setting information in the TLP packet (Step S10). Then, the action list read-out unit 203 proceeds to Step S11.

In contrast, if the trigger is other than the initialization (No at Step S9), the action list read-out unit 203 proceeds to Step S11.

Then, the action list read-out unit 203 increments the action pointer (Step S11) and proceeds to Step S8.

In contrast, if the action data is not present in the entry indicated by the action pointer (No at Step S8), the action list read-out unit 203 notifies the device specifying unit 202 that the reading of the action data has been completed. In response to the notification, the device specifying unit 202 increments the device pointer (Step S12). Then, the device specifying unit 202 moves back to Step S5.

In contrast, if the device data is not present in the entry indicated by the device pointer (No at Step S5), the device specifying unit 202 instructs the busy signal management unit 201 to stop the busy signal. The busy signal management unit 201 stops the busy signal (Step S13).

Figure 9:
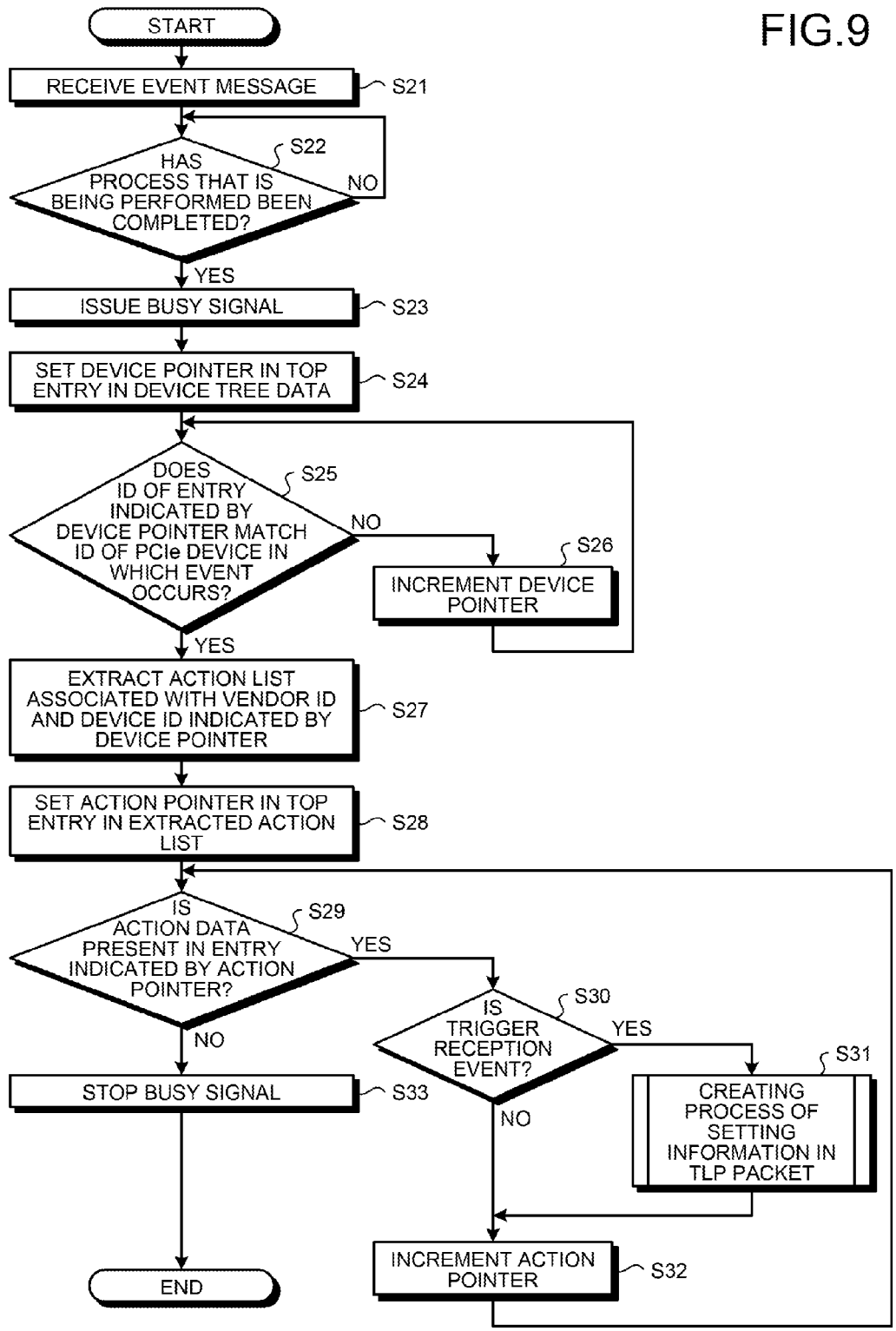
FIG. 9 is a flowchart illustrating the flow of a creating process of the setting information in the TLP packet at the time of the occurrence of an error and at the time of interrupt in the PCIe bridge according to the embodiment.

In the following, a creating process of the setting information in the TLP packet created at the time of the occurrence of an error and at the time of interrupt in the PCIe bridge 12 according to the embodiment will be described with reference to FIG. 9. FIG. 9 is a flowchart illustrating the flow of a creating process of the setting information in the TLP packet at the time of the occurrence of an error and at the time of interrupt in the PCIe bridge according to the embodiment.

The device specifying unit 202 receives, from the interrupt process address conversion module 123, an event message, i.e., an error message or interrupt information from the PCIe device 30 (Step S21). Then, the device specifying unit 202 sends an issue request of a busy signal to the busy signal management unit 201.

In response to the issue request of the busy signal, the busy signal management unit 201 determines whether the process being performed between the core 11 and the PIO management unit 125 via the system-side input unit 122 has been completed (Step S22). If the process that is being performed has not been completed (No at Step S22), the busy signal management unit 201 waits until the process that is being performed is completed. In contrast, if the process that is being performed has been completed (Yes at Step S22), the busy signal management unit 201 issues a busy signal to the system-side input unit 122 (Step S23). Then, the busy signal management unit 201 notifies the device specifying unit 202 that the busy signal has been issued.

Then, the device specifying unit 202 sets a device pointer in the top entry in the device tree data 128 (Step S24).

Then, the device specifying unit 202 determines whether ID of entry indicated by device pointer matches ID of PCIe device in which event occurs (Step S25).

If the device data is not present in the entry indicated by the device pointer (No at Step S25), the device specifying unit 202 increments the device pointer (Step S26). Then, the device specifying unit 202 returns to Step S25.

In contrast, if the device data is present in the entry indicated by the device pointer (Yes at Step S25), the device specifying unit 202 notifies the action list read-out unit 203 of the vendor ID and the device ID stored in the entry indicated by the device pointer. The action list read-out unit 203 extracts the action list 127 associated with the vendor ID and the device ID indicated by the device pointer (Step S27).

The action list read-out unit 203 sets the action pointer in the top entry in the extracted action list 127 (Step S28).

The action list read-out unit 203 determines whether the action data is present in the entry indicated by the action pointer (Step S29). If the action data is present (Yes at Step S29), the action list read-out unit 203 determines whether the trigger of the subject action data is a reception event (Step S30). If the trigger is a reception event (Yes at Step 30), the action list read-out unit 203 performs the creating process of the setting information in the TLP packet (Step S31). Then, the action list read-out unit 203 proceeds to Step S32.

In contrast, if the trigger is other than the reception event (No at Step 30), the action list read-out unit 203 proceeds to Step S32.

Then, the action list read-out unit 203 increments the action pointer (Step S32) and moves back to Step S29.

In contrast, if the action data is not present in the entry indicated by the action pointer (No at Step S29), the action list read-out unit 203 notifies the device specifying unit 202 that the reading of the action data has been completed. In response to the notification, the device specifying unit 202 instructs the busy signal management unit 201 to stop the busy signal. The busy signal management unit 201 stops the busy signal (Step S33).

Figure 10:
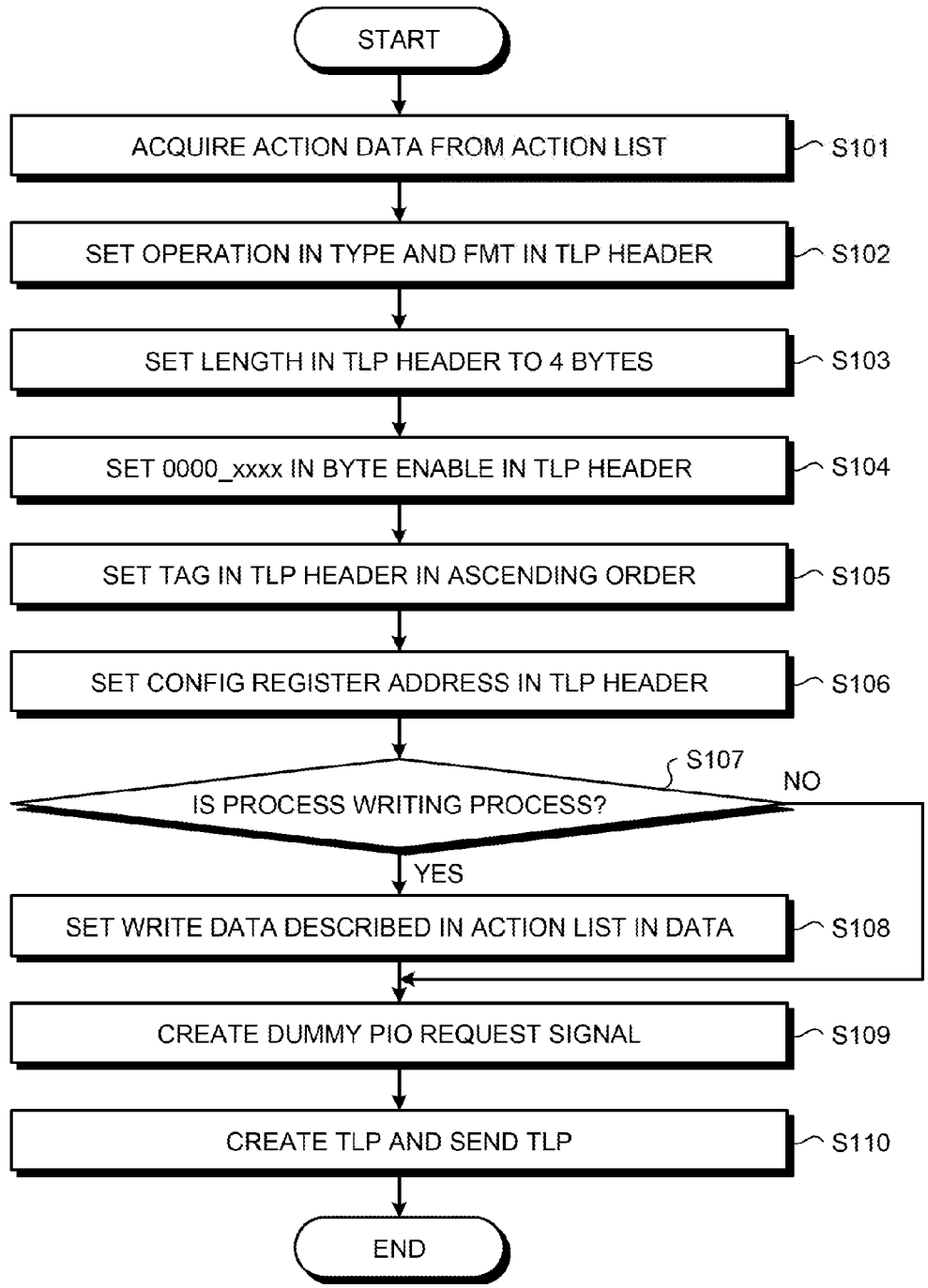
FIG. 10 is a flowchart illustrating the flow of a creating process of the setting information in the TLP packet.

In the following, the flow of the creating process of the setting information in the TLP packet will be described with reference to FIG. 10. FIG. 10 is a flowchart illustrating the flow of a creating process of the setting information in the TLP packet. The flowchart illustrated in FIG. 10 corresponds to an example of the process performed at Step S10 illustrated in FIG. 8 and the process performed at Step S31 illustrated in FIG. 9.

The action list read-out unit 203 acquires, from the action list 127, the action data registered in the entry indicated by the action pointer (Step S101). The action list read-out unit 203 sends the acquired action data to the TLP information creating unit 204. Furthermore, the device specifying unit 202 sends the vendor ID, the device ID, and the physical address offset to the TLP information creating unit 204.

The TLP information creating unit 204 receives the action data from the action list read-out unit 203. Furthermore, the TLP information creating unit 204 receives the vendor ID, the device ID, and the physical address offset from the device specifying unit 202. Then, the TLP information creating unit 204 sets an operation in the Fmt 401 and the Type 402 in the TLP header 301 (Step S102).

Then, the TLP information creating unit 204 sets the Length 403 in the TLP header 301 to 4 bytes (Step S103).

Then, the TLP information creating unit 204 sets 0000_xxxx in the Byte Enable (BE) 405 in the TLP header 301 (Step S104).

Then, the TLP information creating unit 204 sets the Tag 404 in the TLP header 301 in ascending order (Step S105).

Then, the TLP information creating unit 204 sets the config register address to the bits obtained by adding the physical address offset to the bits [11:0] of the Address 406 in the TLP header 301 (Step S106).

Then, the TLP information creating unit 204 determines whether the process causing the PCIe device 30 to perform by using the subject TLP is a writing process (Step S107). If the process causing the PCIe device 30 to perform is other than the writing process (No at Step S107), the process proceeds to Step S109.

In contrast, if the process causing the PCIe device 30 to perform is the writing process (Yes at Step S107), the TLP information creating unit 204 sets the write data described in the action list 127 in the data 302 (Step S108). Then, the TLP information creating unit 204 sends each piece of the setting information to the packet management unit 205 together with the device location information.

The packet management unit 205 receives the device location information and the setting information from the TLP information creating unit 204. Then, the packet management unit 205 creates a dummy PIO request signal (Step S109). The packet management unit 205 receives the created dummy PIO request signal and shifts to the state in which the TLP is issued. Thereafter, the packet management unit 205 sends the setting information, the write data, and the device location information to the root complex 13. However, the write data is used only when the process that causes the PCIe device 30 to perform due to the TLP is the writing process.

The root complex 13 receives the setting information, the write data, and the device location information from the packet management unit 205. Then, the root complex 13 creates a TLP from the received setting information and the write data. Thereafter, the root complex 13 sends the created TLP to the PCIe device 30 indicated by the device location information (Step S110).

As described above, with the information processing apparatus according to the embodiment, the PCIe bridge that receives a notification of the occurrence of an event in a specific PCIe device creates a TLP that causes a process to be performed in accordance with the specific PCIe device and sends the TLP. Consequently, when an event occurs, the information processing apparatus can cause each of the PCIe devices to perform the process in accordance with each of the PCIe devices. Furthermore, because the process is performed in the PCIe bridge that is hardware, the process does not depend on the device driver. Consequently, the PCIe bridge can absorb a difference between specifications for each PCIe at the time of the occurrence of event and thus the number of steps of the development of the device driver.

Furthermore, in the above description, a process is performed by the PCIe device by using the TLP when an event occurs; however, another packet may also be used as long as a packet can be controlled by hardware. For example, a physical layer packet or a data link layer packet (DLLP) may also be used.

According to an aspect of an embodiment of the information processing apparatus and the control method of the information processing apparatus disclosed in the present invention, an advantage is provided in that it is possible to contribute to reducing the number of steps of the development of a device driver.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
an arithmetic processing unit;
a plurality of processing units each of which performs a process in accordance with an instruction sent from the arithmetic processing unit;
a switch that relays communication between the arithmetic processing unit and the processing units; and
an input/output control unit that has location information on the location of each of the processing units with respect to the arithmetic processing unit via the switch and execution process information in which a process causing each of the processing units to perform when an event occurs in each of the processing units is registered, that acquires an event occurrence notification when the event occurs in a specific processing unit, that specifies the location of the specific processing unit from the location information on the basis of the acquired event occurrence notification, that extracts a process causing the specific processing unit to perform from the execution process information, and that sends an execution instruction of the extracted process to the specific processing unit on the basis of the specified location.

2. The information processing apparatus according to claim 1, wherein
the location information includes association information in which identification information on each of the processing units is associated with the location of each of the processing units with respect to the arithmetic processing unit via the switch, and
the input/output control unit acquires the location of each of the processing units with respect to the arithmetic processing unit via the switch on the basis of the identification information on each of the processing units and the association information stored in the event occurrence notification.

3. The information processing apparatus according to claim 1, wherein the input/output control unit sends the execution instruction by using a transaction layer packet.

4. The information processing apparatus according to claim 1, wherein, when the processing unit is initialized, the input/output control unit receives the event occurrence notification from the arithmetic processing unit and, when an error occurs in the processing unit or when an interrupt occurs in the processing unit, the input/output control unit receives the event occurrence notification from the processing unit in which the error or the interrupt occurs.

5. A control method of an information processing apparatus that includes an arithmetic processing device, a plurality of devices each of which performs a process in accordance with an instruction sent from the arithmetic processing device, and a switch that relays communication between the arithmetic processing device and the devices, the control method of the information processing apparatus comprising:
acquiring an event occurrence notification when an event occurs in a specific device;
specifying, on the basis of the acquired event occurrence notification, the location of the specific device from location information on the location of each of the devices with respect to the arithmetic processing device via the switch;
extracting a process causing the specific device to perform from execution process information in which a process causing each of the devices to perform when an event occurs in each of the devices is registered; and
sending an execution instruction of the extracted process to the specific device on the basis of the specified location.

* * * * *